United States Patent
Hoehne et al.

(10) Patent No.: US 11,302,108 B2
(45) Date of Patent: Apr. 12, 2022

(54) ROTATION AND SCALING FOR OPTICAL CHARACTER RECOGNITION USING END-TO-END DEEP LEARNING

(71) Applicant: SAP SE, Walldorf (DE)

(72) Inventors: Johannes Hoehne, Berlin (DE); Marco Spinaci, Berlin (DE); Anoop Raveendra Katti, Berlin (DE)

(73) Assignee: SAP SE, Walldorf (DE)

( * ) Notice: Subject to any disclaimer, the term of this patent is extended or adjusted under 35 U.S.C. 154(b) by 442 days.

(21) Appl. No.: 16/565,614

(22) Filed: Sep. 10, 2019

(65) Prior Publication Data
US 2021/0073566 A1 Mar. 11, 2021

(51) Int. Cl.
| | |
|---|---|
| *G06K 9/34* | (2006.01) |
| *G06V 30/148* | (2022.01) |
| *G06N 20/00* | (2019.01) |
| *G06T 7/10* | (2017.01) |
| *G06F 16/901* | (2019.01) |
| *G06F 17/18* | (2006.01) |
| *G06V 30/10* | (2022.01) |

(52) U.S. Cl.
CPC ........ *G06V 30/153* (2022.01); *G06F 16/9024* (2019.01); *G06F 17/18* (2013.01); *G06N 20/00* (2019.01); *G06T 7/10* (2017.01); *G06T 2207/20132* (2013.01); *G06V 30/10* (2022.01)

(58) Field of Classification Search
CPC .... G06V 30/153; G06V 30/10; G06V 10/242; G06V 10/32; G06V 10/454; G06F 16/9024; G06F 17/18; G06N 20/00; G06N 3/08; G06N 3/0454; G06T 7/10; G06T 2207/20132

USPC .......................................................... 382/176
See application file for complete search history.

(56) References Cited

U.S. PATENT DOCUMENTS

| | | | | |
|---|---|---|---|---|
| 8,677,505 | B2 * | 3/2014 | Redlich ................. | G06F 21/577 |
| | | | | 726/27 |
| 9,008,447 | B2 * | 4/2015 | King ........................ | G06K 9/52 |
| | | | | 382/229 |

(Continued)

FOREIGN PATENT DOCUMENTS

| | | |
|---|---|---|
| CN | 106408038 A | 2/2017 |
| CN | 109376658 A | 2/2019 |

(Continued)

*Primary Examiner* — Mahendra R Patel
(74) *Attorney, Agent, or Firm* — Sterne, Kessler, Goldstein & Fox P.L.L.C.

(57) ABSTRACT

Disclosed herein are system, method, and computer program product embodiments for optical character recognition (OCR) pre-processing using machine learning. In an embodiment, a neural network may be trained to identify a standardized document rotation and scale expected by an OCR service performing character recognition. The neural network may then analyze a received document image to identify a corresponding rotation and scale of the document image relative to the expected standardized values. In response to this identification, the document image may be modified in the inverse to standardize the rotation and scale of the document image to match the format expected by the OCR service. In some embodiments, a neural network may perform the standardization as well as the character recognition using a shared computation graph.

14 Claims, 6 Drawing Sheets

(56) References Cited

U.S. PATENT DOCUMENTS

| | | | |
|---|---|---|---|
| 9,043,349 B1* | 5/2015 | Lin | G06K 9/6292 |
| | | | 707/758 |
| 9,298,981 B1* | 3/2016 | Ragnet | G06K 9/00442 |
| 10,361,802 B1* | 7/2019 | Hoffberg-Borghesani | ............... |
| | | | G11B 27/11 |
| 2006/0089907 A1 | 4/2006 | Kohlmaier et al. | |
| 2006/0217955 A1* | 9/2006 | Nagao | G06F 40/58 |
| | | | 704/2 |
| 2006/0218186 A1* | 9/2006 | Bagheri | G06F 16/40 |
| 2007/0053513 A1* | 3/2007 | Hoffberg | G06K 9/00369 |
| | | | 380/201 |
| 2008/0278744 A1* | 11/2008 | Marchesotti | G06F 3/1256 |
| | | | 358/1.15 |
| 2009/0086219 A1* | 4/2009 | Nagashima | G06F 40/53 |
| | | | 358/1.5 |
| 2014/0002589 A1* | 1/2014 | Auberger | H04N 5/23238 |
| | | | 348/36 |
| 2014/0355835 A1* | 12/2014 | Rodriguez-Serrano | ............... |
| | | | G06K 9/3258 |
| | | | 382/105 |
| 2015/0304521 A1* | 10/2015 | Campanelli | G06K 15/1889 |
| | | | 358/1.18 |
| 2016/0217119 A1* | 7/2016 | Dakin | G06F 40/274 |
| 2019/0114743 A1* | 4/2019 | Lund | G06N 3/0454 |

FOREIGN PATENT DOCUMENTS

| | | | | |
|---|---|---|---|---|
| CN | 109446997 A | * | 3/2019 | |
| EP | 0446630 A2 | * | 9/1991 | G06K 9/344 |

* cited by examiner

ROTATION AND SCALING FOR OPTICAL CHARACTER RECOGNITION USING END-TO-END DEEP LEARNING

BACKGROUND

One type of image to text conversion includes optical character recognition (OCR). OCR uses steps such as de-skewing, de-speckling, binarization, line removal, and/or layout analysis followed by character recognition or post-processing. Using multiple steps, however, leads to potential errors such as information loss or distortion in intermediate steps. This information loss or distortion may also especially occur when attempting to recognize characters in documents that are rotated or scaled differently from the expected OCR parameters. In view of the different types of documents considered, the OCR processes may yield erroneous predictions. Further, the sequential nature of pre-processing filed by an OCR process, may result in a time-intensive process that uses significant computational costs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for optical character recognition (OCR) pre-processing using machine learning. The embodiments disclosed herein may identify document image parameters, such as a rotation or scaling, that differ from a standard format expected by an OCR system. Based on this analysis, a system using a machine learning algorithm such as, for example, a neural network may determine a corrective modification to convert the document image by rotating and/or scaling the document image before applying the OCR system to improve the usability and quality of an OCR result generated by the OCR system.

In an embodiment, a system utilizing a machine learning algorithm such as an artificial intelligence process or a neural network, such as a convolutional neural network, may perform pre-processing of a document image prior to performing an OCR process. The pre-processing performed by the machine learning algorithm may determine image parameters corresponding to the document image. The image parameters may define an orientation or scale of the document image relative to an orientation or scale corresponding to the OCR system. For example, the OCR system may be trained to perform character recognition on document images having an up-right orientation and a scale corresponding to an A10 size paper. Document images to be processed, however, may have different rotational values or scale values relative to the parameters expected by the OCR system. In this manner, the machine learning algorithm may perform a pre-processing to standardize the document image to better match the orientation and scale expected by the OCR system.

Figure 1A:
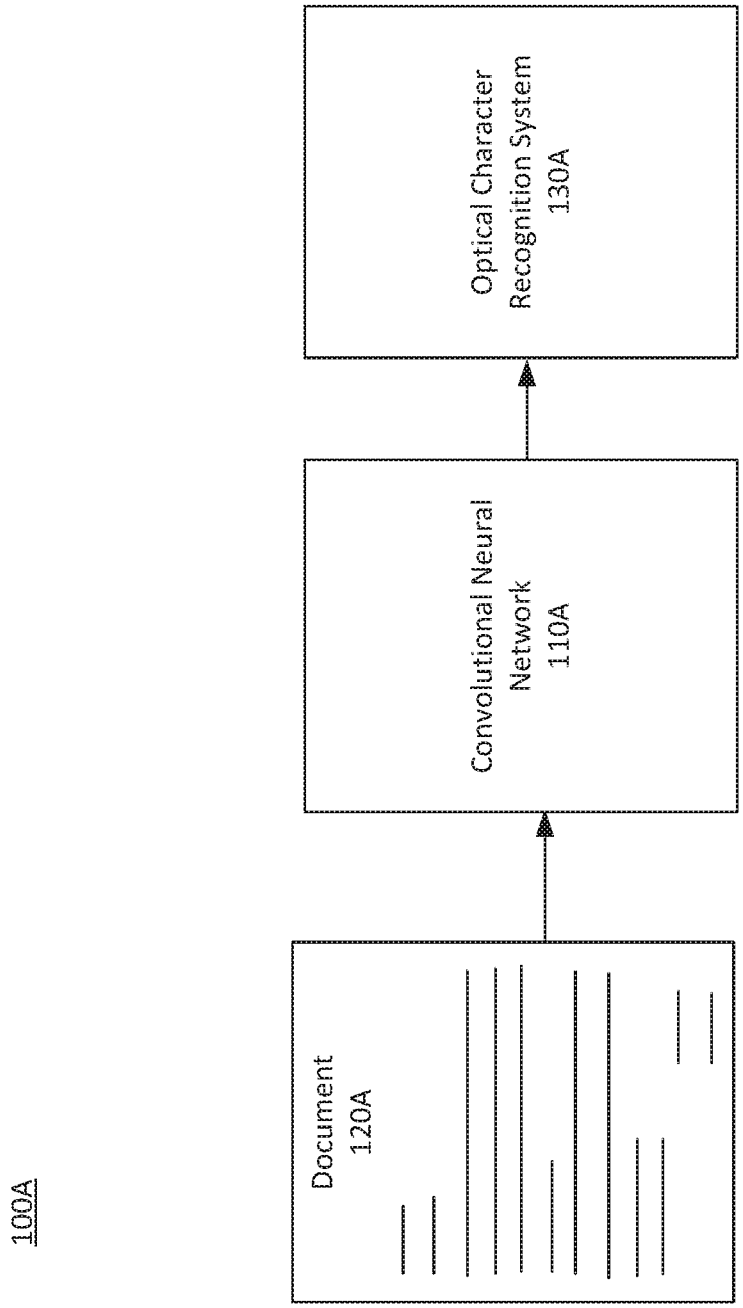
FIG. 1A depicts a block diagram of an optical character recognition environment, according to some embodiments.
Figure 1B:
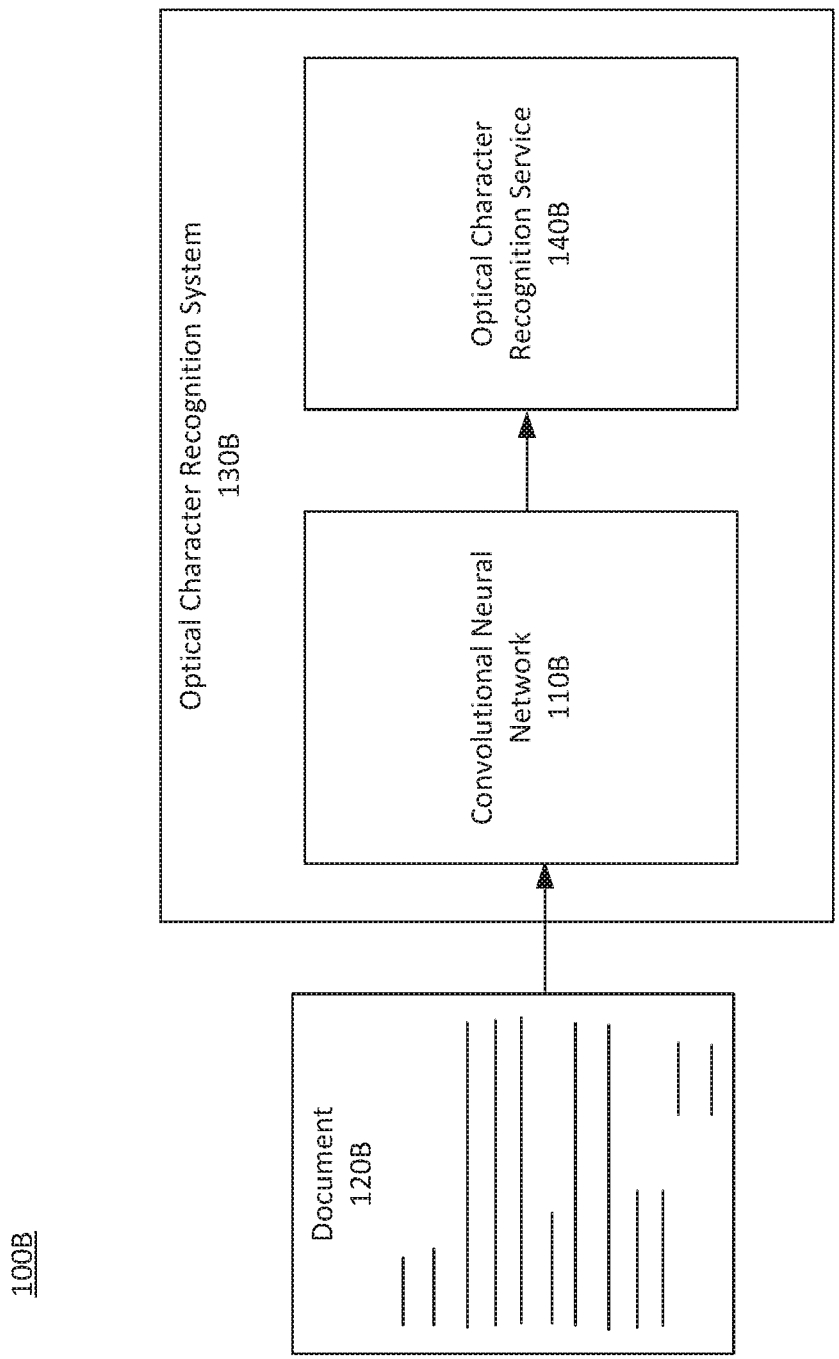
FIG. 1B depicts a block diagram of an optical character recognition environment depicting a combined convolutional neural network and optical character recognition service, according to some embodiments.

To illustrate an example embodiment, the machine learning algorithm may receive a document image, perform pre-processing to standardize the rotation and scale of the document image, and then transmit the standardized document image to an OCR system. The machine learning algorithm may use a neural network to perform these operations. FIG. 1A depicts a neural network as a system separate from an OCR system. In some embodiments, the OCR system may include the neural network along with an OCR service so that the pre-processing and the character recognition may be performed using a shared or common computational graph. In some embodiments, a common neural network may perform the pre-processing as well as the character recognition. FIG. 1B depicts an example embodiment of this type of configuration. This configuration may lead to a faster OCR process as using a shared computation graph reduces computational overhead due to memory reshuffling between different memory addresses. Further, a shared computational graph allows for training of the neural network along with the OCR service in an end-to-end manner.

The shared computation graph may be implemented using hardware such as a graphical processing unit (GPU) or tensor processing units (TPU). Implementation on these processing units may avoid moving information in and out of dedicated memory which could cause latency that harms the overall OCR processing time. By performing the pre-processing as well as character recognition using a shared computational graph instead of moving information between multiple pieces of generic hardware such as a CPU, computational costs and processing time may be saved.

Similarly, by sharing a computational graph between the neural network and an OCR service, the OCR system may reuse the same variables determined by the neural network. For example, the neural network may identify a rotation and/or scaling variable. The OCR service may reuse the same physical memory for these variables when performing character recognition. This shared variable and memory configuration allows for additional optimization to increase processing speeds for character recognition. Similarly, this speed-up may occur during compilation time. Further, the "end-to-end" system that integrates the pre-processing and the character recognition elements may allow for easier training. For example, training may occur in a single step rather than a lengthier and more error-prone multi-step procedure.

Various embodiments of these features will now be discussed with respect to the corresponding figures.

FIG. 1A depicts a block diagram of an optical character recognition (OCR) environment 100A, according to some embodiments. OCR environment 100A may include convolutional neural network 110A, optical character recognition (OCR) system 130A, and document 120A. Document 120A may include handwritten and/or typewritten text. Document 120A may be an image of a document and/or other type of data file having characters that may be identified. Document 120A may be oriented in a particular direction and/or may include a particular scaling of characters. The orientation or scaling may differ from the orientation and scaling of training samples provided to OCR system 130A when training OCR system 130A to recognize text and/or characters from different documents. For example, OCR system 130A may be trained to identify characters from documents having a certain font size and/or orientation.

To standardize document 120A into a format that is more compatible with OCR system 130A, OCR environment 100A includes a convolutional neural network (CNN) 110A. CNN 110A may be trained to identify image parameters corresponding to document 120A such as a rotation or scaling relative to a standard rotation or scaling expected by OCR system 130A. For example, the rotation may identify that document 120A is rotated clockwise by 90 degrees relative to the expected orientation of OCR system 130A. Similarly, CNN 110A may identify that document 120A is scaled at a rate of 70% or 0.7 times the expected rate of the expected font size or scaling of OCR system 130A. In some embodiments, these factors may be selected from a list of possible rotation or scale values. For example, CNN 110A may categorize these variables as a classification problem. In some embodiments, these values may be calculated in a continuous manner as will be further described with reference to FIG. 2A.

Based on the identified rotation and scaling factors, CNN 110A and/or the hardware or processors implementing CNN 110A and/or OCR system 130A may modify document 120A to better match the expected standardized format. For example, document 120A may be rotated and/or scaled in the opposite direction as the scale and/or rotation detected by CNN 110A. For example, document 120A may be modified using an inverse transformation. If CNN 110A detects that document 120A is rotated 90 degrees clockwise and scaled at a rate of 0.7, document 120A may be modified by rotating document 120A 90 degrees counterclockwise and scaled up by a factor of 10/7 or approximately 1.43 times. In some embodiments, the scaling up may include adding white space to document 120A to generate a standard document size. This process will be further described with reference to FIG. 2A. Based on this modification, document 120A may be transformed into a format more standard and expected by OCR system 130A. In this manner, OCR system 130A may more effectively identify the characters of document 120A based on performing character recognition on the standardized version of document 120A.

In some embodiments, the scaling and/or rotation factors of document 120A may be estimated using a machine learning algorithm such as CNN 110A. CNN 110A may be trained to classify images and use architectures such as VGG, ResNet, DenseNet, or other architectures. As will be further described with reference to FIG. 2A, CNN 110A may perform an estimate and output a scale vector and/or a rotation vector. These vectors may be based on estimated probabilities based on an analysis of portions of document 120A. In some embodiments where the determination of these factors yield a continuous rather than a discrete result, CNN 110A may perform a regression analysis to predict two values rather than two vectors of probabilities for rotation and scale. These values may then be used to standardize document 120A relative to the expected formatting for OCR system 130A.

After document 120A has been standardized based on the image parameters determined by CNN 110A, OCR system 130A may perform character recognition on the standardized version of document 120A. OCR system 130A may be a neural network or other system trained to identify characters from image documents. OCR system 130A may accept the standardized version of document 120A as an input. Using a character recognition process or algorithm, OCR system 130A may produce a version of document 120A as an output having optically recognized text. The output of OCR system 130A may be utilized by a computer system to perform further document processing on document 120A.

FIG. 1B depicts a block diagram of an optical character recognition environment 100B depicting a combined convolutional neural network (CNN) 110B and optical character recognition (OCR) service 140B, according to some embodiments. CNN 110B and OCR service 140B may be implemented within optical character recognition (OCR) system 130B. OCR system 130B may utilize both subsystems to perform pre-processing on document 120B and to optically recognize the characters of document 120B.

As previously explained, combining CNN 110B and OCR service 140B into an OCR system 130B may allowed OCR system 130B to utilize a common or shared computational graph across both subsystems. The computational graph may represent a mathematical function used in deep learning models of artificial intelligence or machine learning algorithms. The computational graph may include nodes connected by corresponding edges. To generate a shared computational graph, OCR system 130B may train a neural network to perform pre-processing of document 120B, such as standardizing the rotation and scale of document 120B, along with the character recognition. In some embodiments, a single neural network may perform these functions so that the generated computational graph may be shared.

OCR system 130B may implemented CNN 110B and OCR service 140B on hardware such as a graphical processing unit (GPU) or tensor processing unit (TPU). Implementation on these units using a shared computational graph may avoid moving information in and out of dedicated memory. Using the shared computation graph may reduce latency that may harm the overall OCR processing time. By performing the pre-processing as well as character recognition using a shared computational graph instead of moving information between multiple pieces of generic hardware such as a CPU, computational costs and processing time may be saved.

Figure 2A:
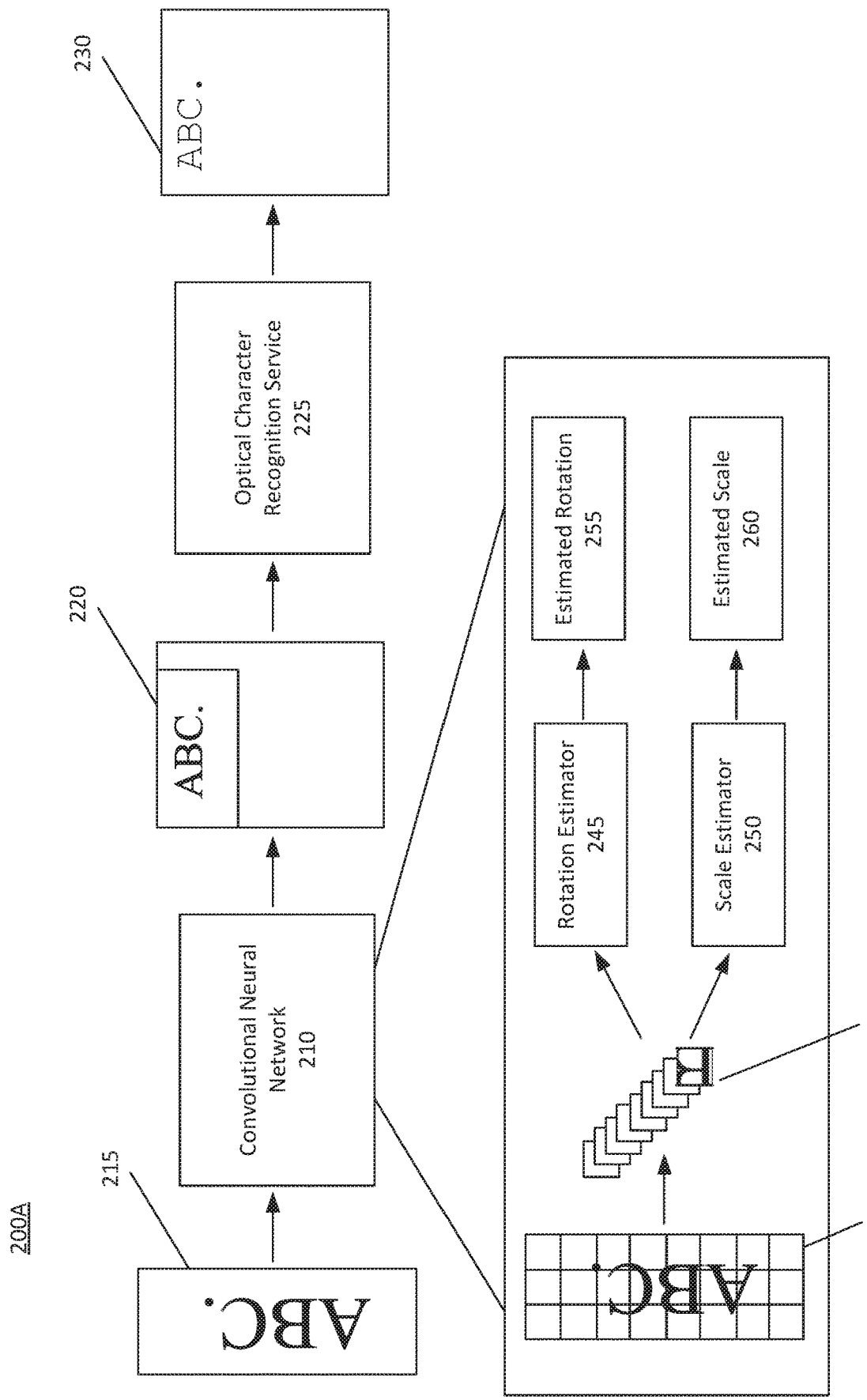
FIG. 2A depicts a block diagram of an optical character recognition flow, according to some embodiments.

FIG. 2A depicts a block diagram of an optical character recognition (OCR) flow 200A, according to some embodiments. OCR flow 200A may depict a pre-processing and character recognition process performed by convolutional neural network (CNN) 210 and optical character recognition (OCR) service 225. CNN 210 may identify a rotation and/or scaling of a document image 215 relative to a standardized format expected by OCR service 225. OCR service 225 may have been trained to identify characterized in this expected format. In some embodiments, CNN 210 and OCR service 225 may be implemented using a common neural network, machine learning algorithm, and/or computational graph. OCR flow 200A depicts an example embodiment with various steps of a combined process using CNN 210 and OCR service 225.

CNN 210 may receive a document image 215. Document image 215 may be a document and/or a portion of a document. In some embodiment, document image 215 may include typed and/or hand-written text. Document image 215 may include a particular rotation and/or scale relative to an expected scale and/or rotation of a document and/or font expected by OCR service 225. For example, OCR service 225 may expected an up-right document image with a particular font size. Document image 215 may be rotated 90 degrees counterclockwise relative to this expected format and/or may include a font size 150% or 1.5 times greater than the expected font size. Document image 215 may include other rotations, such as different degrees clockwise or counterclockwise, as well as different scaling that may be larger or smaller than the expected font size.

CNN 210 may identify these image parameters of document image 215 to generate a standardized document image 220. To identify the rotation and/or scaling parameters, CNN 210 may generate a gridded document image 235. The gridded document image 235 may be a version of document image 215 having a grid of cropped portions 240. The cropped portions 240 may be a smaller resolution relative to the size of document image 215. For example, each cropped portion 240 may have a smaller width and/or height than document image 215. CNN 210 may analyze each of these cropped portions 240 to determine a relative scale and/or rotation of document image 215. In some embodiments, the scale and/or rotation may be determined using an estimation based on an analysis of each cropped portion 240. Rotation estimator 245 may be a portion of CNN 210 that generates an estimated rotation 255 while scale estimator 250 may be a portion of CNN 210 that generates an estimated scale 260.

CNN 210 may be trained to perform an analysis on each cropped portion 240 to determine a scale and/or rotation of document image 215. For example, rotation estimator 245 may analyze each cropped portion 240 to determine the orientation of characters within each cropped portion 240. Rotation estimator 245 may rely on the training of CNN 210 to identify the rotation. For example, rotation estimator 245 may apply random rotations to each cropped portion 240 and perform a classification to determine character orientations that match an expected orientation. Rotation estimator 245 may apply this type of analysis on each cropped portion 240 to determine a rotation of each cropped portion 240. Rotation estimator 245 may then aggregate each rotation value result to determine an overall rotation for document image 215. The aggregation may include an averaging of each determined rotation. Similarly, a rotation probability vector may be generated and the estimated rotation 255 may be selected as the value identifying the mode of the vector. In some embodiments, CNN 210 may ignore areas or cropped portions 240 that contain no text. For example, the cropped portion 240 may be designated as having neutral probability when determining the estimated rotation 255 of document image 215.

In some embodiments, the aggregation may include an analysis identifying a multimodal rotation. By aggregating the different rotation values identified for each cropped portion 240, rotation estimator 245 may account for a document image 215 having text or characters with different orientations. For example, some characters may be written horizontally on document image 215 while other characters may be written vertically. Similarly, the characters may be written in different degrees of rotation that may be continuous around, for example, a unit circle. Based on the aggregation and the corresponding analysis provided by the training of CNN 210 and/or rotation estimator 245, CNN 210 may perform a best guess estimation for the rotation of the document image 215 and/or a best guess estimation for portions of document image 215. When determining an overall rotation, if a majority of the text is rotated 25 degrees clockwise, rotation estimator 245 may classify the estimated rotation 255 as a clockwise rotation of 25 degrees.

If CNN 210 is configured to perform a multimodal analysis, the multimodal analysis may identify different rotations for different portions of text. CNN 210 may be configured to analyze each of these cropped portions 240 individually and/or provide different rotations to different portions to standardize document image 215.

Scale estimator 250 may operate in a similar manner to rotation estimator 245. Scale estimator 250 may analyze the cropped portions 240 to determine a scale of document image 215. Scale estimator 250 may analyze each cropped portion to determine a relative scale of the characters within each cropped portion 240. The scale may be identified relative to an expected scale of OCR service 225. Scale estimator 250 may perform a classification to determine character and/or font size. For example, scale estimator 250 may perform random scaling to find matches of expected scale.

Scale estimator 250 may perform this type of analysis on each cropped portion 240 to determine a scale of each cropped portion 240. Scale estimator 250 may the aggregate each scale value result to determine an overall scale for document image 215. The aggregation may include an averaging of each determined scale value. Similarly, a scale probability vector may be generated and the estimated scale 260 may be selected as the value identifying the mode of the vector. In some embodiments, CNN 210 may ignore areas or cropped portions 240 that contain no text. For example, the cropped portion 240 may be designated as a neutral probability when determining the estimated scale 260 of document image 215.

In some embodiments, the aggregation may include an analysis identifying a multimodal scale. By aggregating the different scale values identified for each cropped portion 240, scale estimator 250 may account for a document image 215 having text or characters with different font sizes or scale. For example, some characters may be larger or smaller than other characters. Based on the aggregation and the corresponding analysis provided by the training of CNN 210 and/or scale estimator 250, CNN 210 may perform a best guess estimation for the scale of the document image 215 and/or a best guess estimation for portions of document image 215. When determining an overall scale, if a majority of the text is scaled to a size 1.5 times or 150% larger than an expected size, scale estimator 250 may classify the estimated scale 260 as that size.

If CNN 210 is configured to perform a multimodal analysis, the multimodal analysis may identify different scales for different portions of text. CNN 210 may be configured to analyze each of these cropped portions 240 individually and/or provide different scales to different portions to standardize document image 215.

While CNN 210 may perform a grid analysis and generate cropped portions 240 based on a raw input of document image 215, in some embodiments, CNN 210, or a processor implementing CNN 210, may first attempt to standardize document image 215 by resizing document image 215 to a specific resolution. Document image 215 may be resized to match a specific width and/or height. If document image 215 has a width or height that I smaller than the specific resolution, white space may be added to document image 215 to achieve the desired resolution. Adding white space may avoid distortions in attempting to stretch document image 215 to match the resolution. A grid analysis may then be performed based on this resized document image 215.

Based on estimated rotation 255 and/or estimated scale 260, standardized document image 220 may be generated. Estimated rotation 255 and/or estimated scale 260 may be discrete values selected from a list of possible modifications and/or may be continuous values determined from the aggregation processing. Using the estimated rotation 255 and/or estimated scale 260, a processor implementing CNN 210 and/or OCR service 225 may generate standardized document image 220. The processor may perform a modification that represents an inverse of the estimated rotation 255 and/or estimated scale 260. For example, if the estimated rotation 255 indicates that document image 215 and/or a portion of document image 215 is rotated clockwise by 25 degrees, the processor may perform the inverse modification of applying a counterclockwise rotation by 25 degrees. This rotation may be performed from a center point of document image 215.

Similarly, the inverse of the estimated scale 260 may be performed by the processor. For example, if the estimated scale 260 of document image 215 is two times the expected scale by OCR service 225, the inverse modification may be to scale the document image 215 by half. This modification may apply to the width and/or height of document image 215 and/or a portion of document image 215. In some cases, reducing the size of document image 215 may also include adding additional white space to generate a standardized document image 220 having a size expected to OCR service 225. White space may be added due to the rotation as well. Applying this scale modification as well as the rotation modification to document image 215 may generate standardized document image 220. OCR service 225 may then perform a character recognition process to identify the characters using standardized document image 220. OCR service 225 may then produce the optically recognized document 230.

As will be further described with reference to FIG. 2B, in some embodiments, CNN 210 and OCR service 225 may be implemented in shared hardware and/or may share a common computational graph. This configuration may allow for faster character recognition and may save on memory resources. The shared computational graph may also allow the reuse of the same variables to reuse the same physical memory to allow optimization to provide faster OCR processing.

Similarly, in some embodiments, CNN 210 may determine multiple portions of document image 215 and individually transmit the portions to OCR service 225. CNN 210 may divide document image 215 into multiple portions and individually transmit the portions to OCR service 225. OCR service 225 may then recognize the text and reconcile or recombine the portions to generate optically recognized document 230.

Figure 2B:
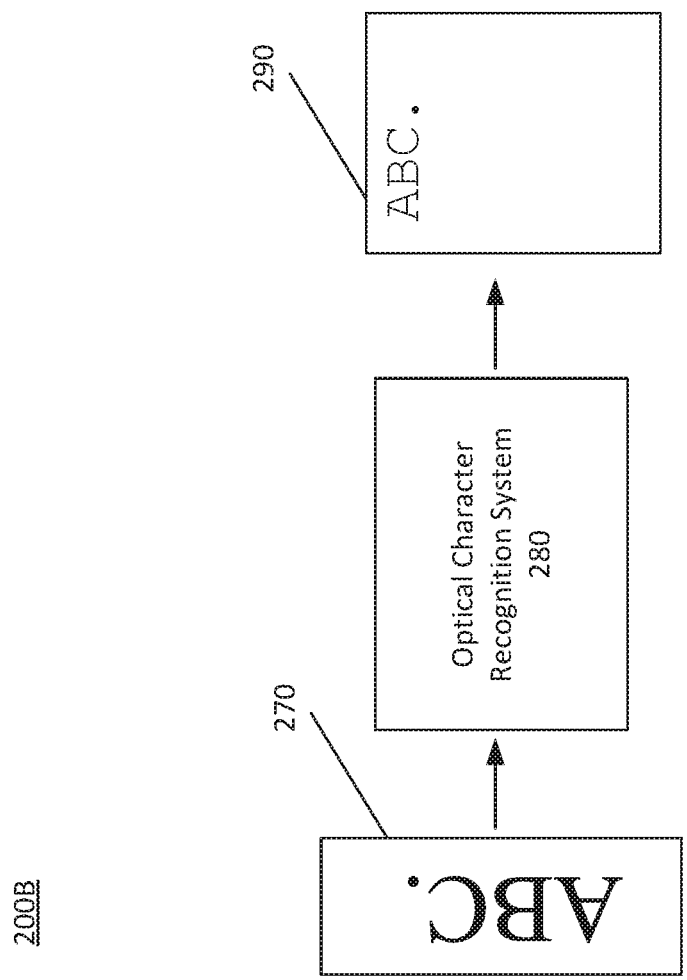
FIG. 2B depicts a block diagram of an optical character recognition flow using a combined system, according to some embodiments.

FIG. 2B depicts a block diagram of an optical character recognition flow 200B using a combined optical character recognition (OCR) system 280, according to some embodiments. OCR system 280 may implement the elements of CNN 210 and OCR service 225 as described with reference to FIG. 2A into a single system. For example, the functionality of CNN 210 and OCR service 225 may be implemented using a single neural network or artificial intelligence model.

OCR system 280 may receive a document image 270 and produce optically recognized document 290. Optically recognized document 290 may include text with optically recognized characters as well as character positions. To generated optically recognized document 290, a neural network implementing the elements of CNN 210 and OCR service 225 may perform pre-processing on document image 270 as well as the optically recognition elements. The combined implementation may lead to a faster OCR process as OCR system 280 may use a common or shared computation graph to perform the pre-processing and character recognition.

By using a common computational graph, OCR system 280 may reuse the same variables determined during pre-processing when performing the character recognition. For example, a neural network used by OCR system 280 may identify a rotation and/or scaling variable. The same neural network may then be trained to reuse the same physical memory for these variables when performing character recognition. This shared variable and memory configuration allows for additional optimization to increase processing speeds for character recognition. Similarly, this speed-up may occur during compilation time. Further, the "end-to-end" system that integrates the pre-processing and the character recognition elements may allow for easier training. For example, training may occur in a single step rather than a lengthier and more error-prone multi-step procedure. OCR system 280 may train a neural network in an "end-to-end" manner to perform both pre-processing and character recognition.

OCR system 280 may implement a neural network using hardware such as a graphical processing unit (GPU) or tensor processing units (TPU). Implementation on these processing units may avoid moving information in and out of dedicated memory which could cause latency that harms the overall OCR processing time. By performing the pre-processing as well as character recognition using a shared computational graph instead of moving information between multiple pieces of generic hardware such as a CPU, computational costs and processing time may be saved.

Figure 3:
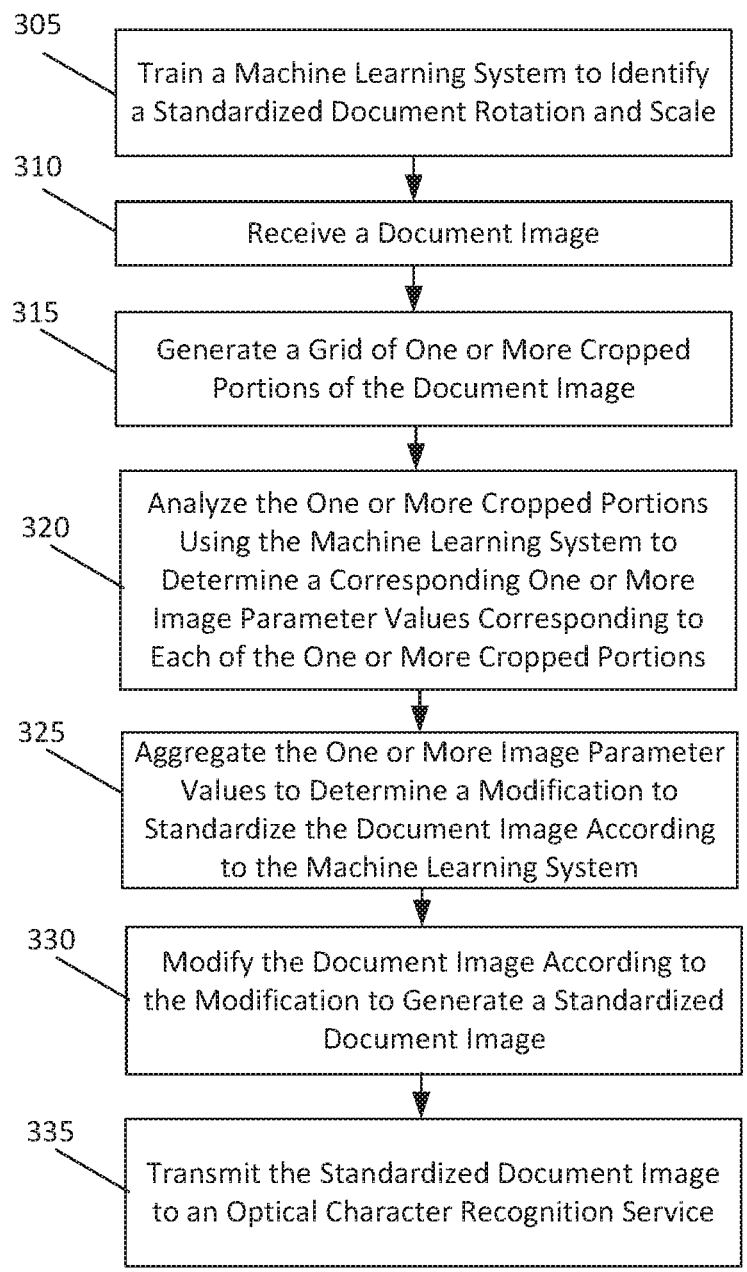
FIG. 3 depicts a flowchart illustrating a method for using a machine learning system for document image pre-processing, according to some embodiments.

FIG. 3 depicts a flowchart illustrating a method 300 for using a machine learning system for document image pre-processing, according to some embodiments. Method 300 shall be described with reference to FIG. 2A; however, method 300 is not limited to that example embodiment.

In some embodiments, a machine learning system may include a processor implementing convolutional neural network (CNN) 210. In some embodiments, the machine learning system may include a processor that utilizes one or more machine learning algorithms, such as supervised learning, unsupervised learning, reinforcement learning, feature learning, sparse dictionary learning, anomaly detection, association rules, artificial neural networks, convolutional neural networks, deep learning, decision trees, support vector machines, Bayesian networks, genetic algorithms, federated learning, and/or other types of machine learning algorithms. These machines learning algorithms may be used as standalone algorithms and/or in combination to perform method 300. For example, the machine learning system may use CNN 210 with or without the other types of machine learning algorithms.

The machine learning system may utilize method 300 to process document image 215. Document image 215 may include handwritten and/or typewritten text. Method 300 may generate a standardized document image 220 having a rotation and/or scale format corresponding to optical character recognition (OCR) service 225. The foregoing description will describe an embodiment of the execution of method 300 with respect to a processor implementing CNN 210. While method 300 is described with reference to CNN 210, method 300 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, the machine learning system may be trained to identify a standardized document rotation and scale. In some embodiments, a processor implementing CNN 210 may train CNN 210 to identify a standardized document rotation and scale. The standardized document rotation and scale may be a document format expected by OCR service 225 and/or another OCR system. In some embodiments, a computing system implementing CNN 210 may also implement OCR service 225, such as the configuration described with reference to FIG. 1B and FIG. 2B. In some embodiments, OCR service 225 may be implementing on a system external to the processor implementing CNN 210. In either case, CNN 210 may be trained to identify the standardized document rotation and scale expected by OCR service 225 to aid in the character recognition elements performed by OCR service 225.

At 310, the machine learning system may receive a document image. In some embodiments, a processor implementing CNN 210 may receive document image 215. Document image 215 may be a document and/or a portion of a document. In some embodiment, document image 215 may include typed and/or hand-written text. Document image 215 may include a particular rotation and/or scale relative to an expected scale and/or rotation of a document and/or font expected by OCR service 225. Document image 215 may be received and/or retrieved from the memory of a computer system utilizing the processor. In some embodiments, document image 215 may be a scanned image or a photograph data file received by the processor.

At 315, the machine learning system may generate a grid of one or more cropped portions of the document image. In some embodiments, a processor implementing CNN 210 may generate a grid of one or more crop portions 240 of document image 215. This grid may generate gridded document image 235. The gridded document image 235 may be a version of document image 215 having a grid of cropped portions 240. The cropped portions 240 may be a smaller resolution relative to the size of document image 215. For example, each cropped portion 240 may have a smaller width and/or height than document image 215. If document image 215 has a width and height of [W, H], the crop portions 240 may include a smaller resolution of [w, h]. The crop portions 240 will then be further analyzed to generate a number of pairs of probability vectors equal to W*H/(w*h).

At 320, the machine learning system may analyze the one or more cropped portions to determine a corresponding one or more image parameter values corresponding to each of the one or more cropped portions. In some embodiments, a processor may use CNN 210 to analyze the one or more cropped portions 240 to determine one or more image parameter values corresponding to each of the one or more cropped portions 240. The one or more image parameter values may include a rotation value for each cropped portion 240 relative to the orientation expected by OCR service 225. Similarly, the one or more image parameter values may include a scale value for each cropped portion 240 relative to the font size expected by OCR service 225.

CNN 210 may analyze each of these cropped portions 240 to determine a relative scale and/or rotation of document image 215. In some embodiments, the scale and/or rotation may be determined using an estimation based on an analysis of each cropped portion 240. Rotation estimator 245 may be a portion of CNN 210 that generates an estimated rotation 255 while scale estimator 250 may be a portion of CNN 210 that generates an estimated scale 260. Rotation estimator 245 may identify the rotations of each cropped portion 240 while scale estimator 250 may identify the scale of each cropped portion. The identification of the rotation and scale may be based on the training of CNN 210. In performing these identifications, CNN 210 may ignore cropped portions 240 that contain no text or white space to speed up the processing. These blank cropped portions may be designated as having a neutral probability when determining the estimated rotation or scale of each cropped portion 240.

Based on the analysis of each cropped portion, CNN 210 may generate pairs of probability vectors indicating estimated rotation and/or scale values corresponding to each cropped portion 240.

At 325, the machine learning system may aggregate the one or more image parameters values to determine a modification to standardize the document image. In some embodiments, a processor implementing CNN 210 may aggregate the one or more image parameters to determine a modification to standardize document image 215 according to CNN 210. The aggregation may include determining an average rotation based on the estimated rotation values determined for each cropped portion 240. Similarly, the aggregation may include determining an average scale based on the estimated scale values determined for each cropped portion 240. If CNN 210 is trained to identify an estimated rotation 255 and an estimated scale 260 for document image 215, CNN 210 may identify these values using a modal analysis, averaging, and/or other aggregation technique to analyze the different values detected via the analysis of the cropped portions 240.

In some embodiments, CNN 210 may be configured to perform a multimodal analysis to identify different groups of cropped portions have a certain rotation (and/or scale) while another group has a different rotation (and/or scale). If these differences are detected, CNN 210 may identify different modifications corresponding to the different image parameters for the different portions of document image 215.

Based on the one or more estimated rotation 255 and estimated scale 260 values determined from an analysis of the cropped portions 240, the processor implementing CNN 210 may also determine a corresponding modification to standardize document image 215. The modification may be the inverse of an estimated rotation 255 and estimated scale 260. For example, if the estimated rotation 255 is a rotation of 25 degrees clockwise, the modification may be a counterclockwise rotation of 25 degrees. Similarly, if the estimated scale 260 is 200% or double the standard font size, the modification may be to half the font size. This modification may apply to the width and/or height of document image 215 and/or a portion of document image 215.

At 330, the machine learning system may modify the document image according to the modification to generate a standardized document image. In some embodiments, a processor implementing CNN 210 may modify document image 215 according to the modification to generate a standardized document image 220. As previously described this modification may be an inverse of the estimated rotation 255 and estimated scale 260 values determined from an analysis of the cropped portions 240.

In some embodiments, if the modification includes reducing the size of document 215, the processor my also add additional white space to generate a standardized document image 220 having a size expected to OCR service 225. White space may be added due to the rotation as well. Applying this scale modification as well as the rotation modification to document image 215 may generate standardized document image 220.

At 335, the machine learning system may transmit the standardized document image to an optical character recognition service. In some embodiments, a processor implementing CNN 210 may transmit the standardized document image 220 to an OCR service 225. In some embodiments, OCR service 225 may be implementing using a system external to the processor implementing CNN 210. In this manner, the transmission may include a wired or wireless transmission of standardized document image 220.

The processor implementing CNN 210 may also implement OCR service 225. In this case, the transmission may be a logical flow transition to the character recognition elements of the analysis. In some embodiments where the processor utilizes a shared neural network to implement CNN 210 and OCR service 225, the transmission may also represent the character recognition elements of the neural network analysis.

Figure 4:
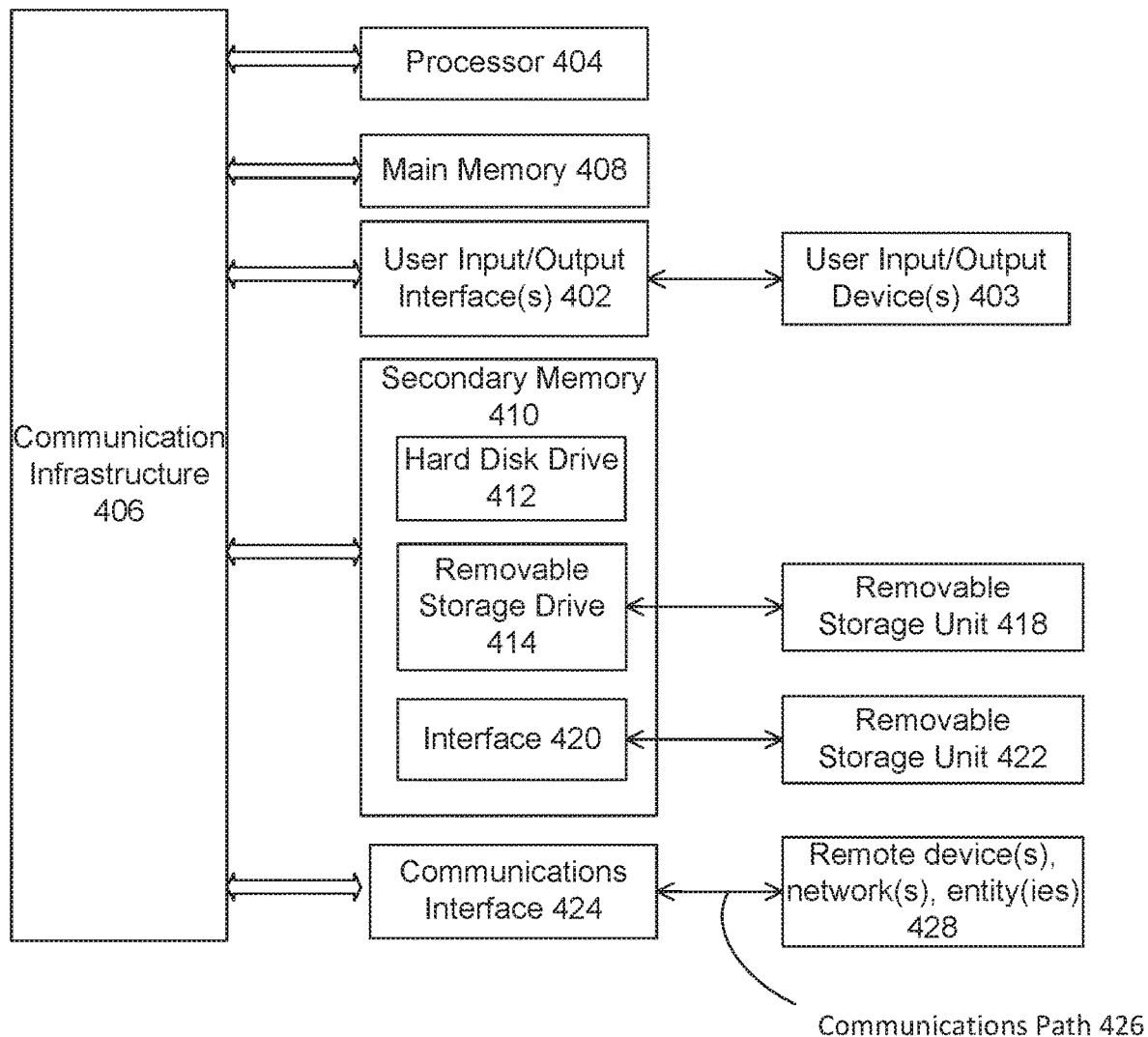
FIG. 4 depicts an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   receiving a document image;
   generating a grid of one or more cropped portions of the document image;
   analyzing the one or more cropped portions using a machine learning algorithm to determine a corresponding one or more image parameter values corresponding to each of the one or more cropped portions;
   aggregating the one or more image parameter values to determine a modification to standardize the document image according to the machine learning algorithm;
   modifying the document image according to the modification to generate a standardized document image, wherein the modifying comprises dividing the document image into multiple portions;
   transmitting the standardized document image to an optical character recognition (OCR) service, wherein the transmitting comprises transmitting the multiple portions to the OCR service for individual character recognition of the multiple portions, and wherein the machine learning algorithm and the OCR service use a common computational graph; and
   combining the multiple portions after the OCR service has performed an individual character recognition process on the multiple portions.

2. The computer implemented method of claim 1, wherein the one or more image parameter values are scaling parameter values indicating a scale size of each crop portion relative to an expected scale size expected by the OCR service.

3. The computer implemented method of claim 1, wherein the one or more image parameter values are rotation parameter values indicating a rotation of each crop portion relative to an expected orientation expected by the OCR service.

4. The computer implemented method of claim 1, wherein the aggregating further comprises:
   calculating an average of a vector including the one or more image parameter values to determine the modification.

5. The computer implemented method of claim 1, wherein the modifying further comprises:
   adding white space to the document image to generate the standardized document image.

6. A system, comprising:
   a memory; and
   at least one processor coupled to the memory and configured to:
   receive a document image;
   generate a grid of one or more cropped portions of the document image;
   analyze the one or more cropped portions using a machine learning algorithm to determine a corresponding one or more image parameter values corresponding to each of the one or more cropped portions;
   aggregate the one or more image parameter values to determine a modification to standardize the document image according to the machine learning algorithm;
   modify the document image according to the modification to generate a standardized document image, wherein the modifying comprises dividing the document image into multiple portions;
   transmit the standardized document image to an optical character recognition (OCR) service, wherein the transmitting comprises transmitting the multiple portions to the OCR service for individual character recognition of the multiple portions, and wherein the machine learning algorithm and the OCR service use a common computational graph; and combine the multiple portions after the OCR service has performed an individual character recognition process on the multiple portions.

7. The system of claim 6, wherein the one or more image parameter values are scaling parameter values indicating a scale size of each crop portion relative to an expected scale size expected by the OCR service.

8. The system of claim 6, wherein the one or more image parameter values are rotation parameter values indicating a rotation of each crop portion relative to an expected orientation expected by the OCR service.

9. The system of claim 6, wherein to aggregate the one or more image parameters, the at least one processor is further configured to:

calculate an average of a vector including the one or more image parameter values to determine the modification.

10. The system of claim 6, wherein to modify the document image, the at least one processor is further configured to:

add white space to the document image to generate the standardized document image.

11. A non-transitory computer-readable device having instructions stored thereon that, when executed by at least one computing device, cause the at least one computing device to perform operations comprising:

receiving a document image;

generating a grid of one or more cropped portions of the document image;

analyzing the one or more cropped portions using a machine learning algorithm to determine a corresponding one or more image parameter values corresponding to each of the one or more cropped portions;

aggregating the one or more image parameter values to determine a modification to standardize the document image according to the machine learning algorithm;

modifying the document image according to the modification to generate a standardized document image, wherein the modifying comprises dividing the document image into multiple portions;

transmitting the standardized document image to an optical character recognition (OCR) service, wherein the transmitting comprises transmitting the multiple portions to the OCR service for individual character recognition of the multiple portions, and wherein the machine learning algorithm and the OCR service use a common computational graph; and combining the multiple portions after the OCR service has performed an individual character recognition process on the multiple portions.

12. The non-transitory computer-readable device of claim 11, wherein the one or more image parameter values are scaling parameter values indicating a scale size of each crop portion relative to an expected scale size expected by the OCR service.

13. The non-transitory computer-readable device of claim 11, wherein the one or more image parameter values are rotation parameter values indicating a rotation of each crop portion relative to an expected orientation expected by the OCR service.

14. The non-transitory computer-readable device of claim 11, wherein the aggregating further comprises:

calculating an average of a vector including the one or more image parameter values to determine the modification.

\* \* \* \* \*